Feb. 24, 1953 F. LINDHE ET AL 2,629,179
FOLDING RULE JOINT
Filed May 26, 1951
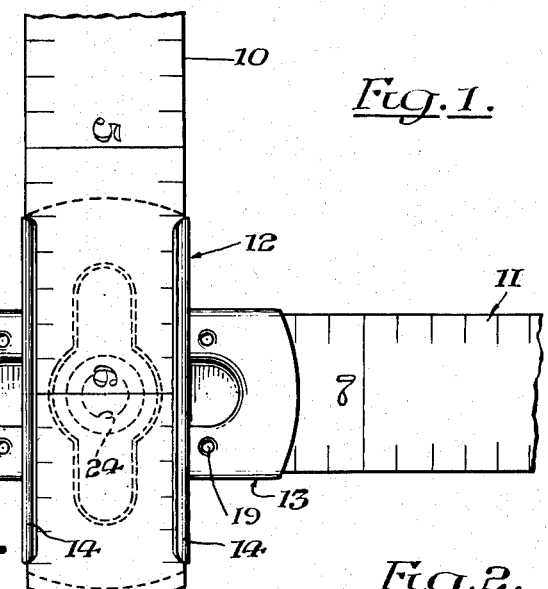
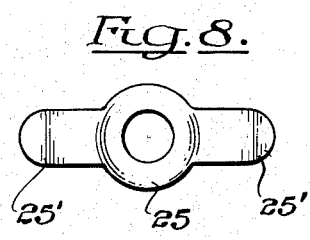
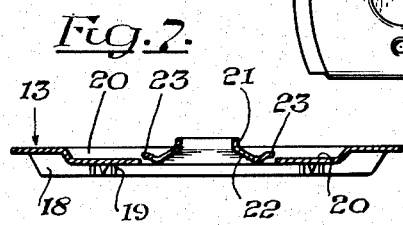
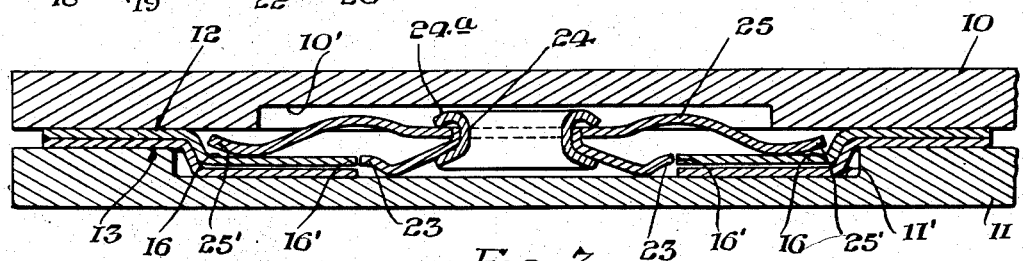
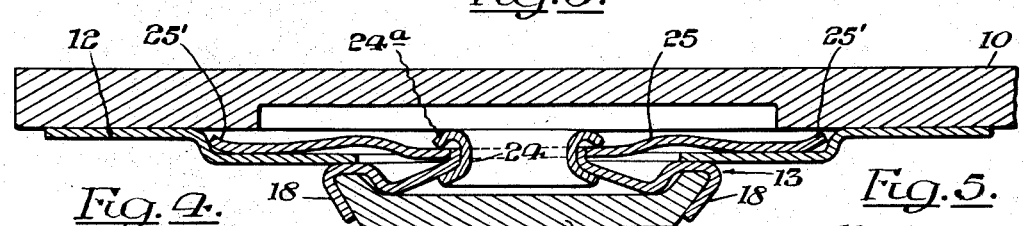
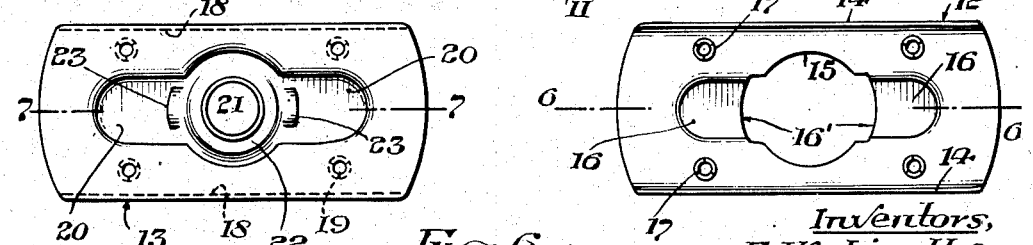
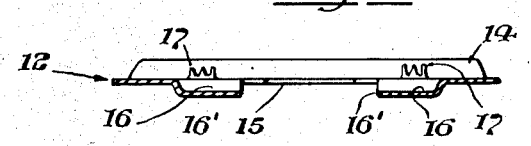
Inventors,
Folke Lindhe
William H. Hodge
by their Attorneys,
Darby & Darby Patented Feb. 24, 1953

2,629,179

UNITED STATES PATENT OFFICE 2,629,179

FOLDING RULE JOINT

Folke Lindhe and William H. Hodge, Middletown, N. Y., assignors to Master Rule Manufacturing Co., Inc., Middletown, N. Y., a corporation of New York Application May 26, 1951, Serial No. 228,496

6 Claims. (Cl. 33—115)

This invention relates to improvements in the hinged joint of folding or, as sometimes called, zig-zag rules.

One important object of this invention is the provision of a novel form of spring controlled hinged joint for rules of this type in conjunction with means which substantially eliminates play at the joints, and, therefore, minimizes the tendency to vary in length.

Another object of this invention is to provide an improved spring controlled joint in which there is eliminated the tendency of contiguous rule sections to have looseness at the hinged points for any direction of stress, thereby insuring a stronger and more effective rule.

Still another object of the invention is to provide a spring controlled hinged joint for folding rules in which the spring action is enhanced by reason of the structure employed, thereby more securely locking the rule sections in folded and extended positions.

Another object of the invention is to provide a spring controlled hinged joint for a folding rule, including means for preventing relative movement other than rotational between the rule sections when folded and unfolded as well as when in intermediate rotational position.

Still another object of the invention is to provide a pivoted hinge joint for a folding rule employing an eyelet type of hinge pin by means of which a relatively greater radius for the pivot action is provided, whereby relative rotational movement of the adjacent rule sections on their longitudinal axes is prevented.

Finally, by reason of the construction herein disclosed, the object of obtaining a far stronger hinge joint for folding rules is attained.

Other and more detailed objects of the invention will be apparent from the following description of the embodiment thereof illustrated in the attached drawings.

In the drawings,

Figure 1 is a plan view of the hinged joint of this invention, showing all of adjacent pair of rule sections pivotally connected together and lying in right angle relationship;

Figure 2 is a longitudinal, central, cross-sectional view through the hinge joint showing the relationship of the parts when the rule is either completely folded or unfolded;

Figure 3 is a similar cross-sectional view showing the relationship of the parts when the rule sections are at right angles as illustrated in Figure 1;

Figure 4 is a plan view of one of the hinge plates of the joint;

Figure 5 is a plan view of the other hinge plate;

Figure 6 is a cross-sectional view taken on the line 6—6 of Figure 5;

Figure 7 is a cross-sectional view taken on the line 7—7 of Figure 4; and

Figure 8 is a plan view of the spring.

Those who have had experience with folding rules know of the errors in measurements likely to arise by variations in the length of folding rules under tension or compression due to looseness which develops, or is present, in the pivotal connections between the several sections as they wear in use, or by reason of the construction employed. The looseness which develops and, thereby results in an elongation of the rule when stretched and a shortening of it when compressed endwise, is due to the fact that the pivotal connections have not been properly devised to prevent such wear. Likewise, these variations are frequently due to inherent looseness in hinged joints by reason of the constructions commonly employed.

Likewise, the tendency of the adjacent sections to be slightly relatively rotational with respect to each other about their longitudinal axes when unfolded is due to the inherent looseness in the joints as commonly made. Finally, the controlling spring, which forms a part of these joints, is commonly constructed and incorporated so as to permit of slight relative movement of adjacent rule sections in all directions causing these defects.

The structure herein disclosed substantially completely eliminates each and every one of these defects. This is accomplished by a structure which remains exceedingly simple, which is adapted to mass production by ordinary manufacturing processes, and which is capable of holding the relatively strong springs in proper operative relationship with the other parts under normal conditions of use. Finally the structure is easily assembled. Such changes in length that might develop due to wear in the joint cannot cause this defect because the hinge plates are interlocked in all positions to prevent it.

A pair of adjacent folding rule sections are shown in part at 10 and 11. They are connected by a hinge joint comprising a pair of thin metal cooperating hinge plates 12 and 13 which are respectively attached to the adjacent ends of the adjacent sections 10 and 11 respectively. The plate 12 is provided with a pair of marginal flanges 14 and the plate 13 is provided with a pair of marginal flanges 18 which are folded around the edges of the rule sections 10 and 11 to clamp them firmly thereto. As is well known in the art, the edges of the rule sections at the ends are beveled to facilitate this clamping action. Also, to insure against sliding movement of the plates 12 and 13, they are provided with prongs 17 and 19 which cause the metal thereof to bite into the wood and, thereby, more firmly attach them in place.

The plate 12 as viewed from the inside, that is the flanged side, Figure 5, is provided with a central opening 15 and a pair of diametrically opposed depressions 16, terminating at the edges 16'. These plates are through-deformed, so that in fact there is provided a pair of bosses on the other side, see Figure 6.

The other plate of the hinge, that is plate 13, has depressions 20 of substantially the same configuration as that provided by the outline of the depressions 16 and opening 15. The bosses formed by the depressions 16 will nest snugly in the depressions 20 of the plate 13 when assembled, as will be seen from Figure 2. This nesting, of course, occurs only when the plates are longitudinally aligned as they are when the rule sections are either completely folded or extended. The plate 13 is also through-deformed so that a boss of the outline which is clear from Figure 4 appears on its underside, and space is provided for it in a routed out recess 11' in the rule section 11, as shown in Figure 2. Rule section 10 is similarly routed out at 10' so that the sections when assembled form a cavity in which the hinge structure is for the most part enclosed.

The plate 13 is provided with a central opening which is defined by a tubular transversely extending formation consisting of a truncated conical portion 22, see Figure 7, terminating in a short cylindrical portion 21. At diametric points, longitudinal of the plate 13, a pair of lips 23 are struck up out of the wall of the depression 20, as is likewise clearly shown in Figures 2 and 4.

The pivot pin is in the form of a tubular eyelet 24 consisting of a truncated conical portion merging into a cylindrical portion of uniform diameter. This eyelet is complementarily shaped with respect to the extension 21—22 so as to nest therein, as shown in Figures 2 and 3.

The controlling spring consists of a piece of spring steel of the configuration shown in Figures 2 and 8. It consists of a central disc-like portion having a pair of diametrically arranged wings which are laterally offset. The disc-like portion has a central aperture which forms a snug fit on the cylindrical portion 21 of plate 13.

The parts are assembled before they are attached to the rule sections and when assembled plate 12 rests on top of plate 13 and spring 25 lies with its wings in the depressions 16. The eyelet 24 is clinched over, as shown at 24ª to engage spring 25, as shown in Figure 2.

With the parts thus assembled, as shown in Figure 2, it will be seen that relative longitudinal movement of the rule sections at the joint when the rule is completely folded or unfolded is prevented by the cooperating engagement of the wings 23 with the abutment edges 16'. It will be noted, however, that when the rule sections are in a position say at right angles to each other, as shown at Figure 1, the wings 23 are out of alignment with the abutment edges 16', with the result that without some provision to prevent it, the two sections could be freely moved with respect to each other.

It will be seen upon consideration that the hinge plate 13 could move linearly with respect to the hinge plate 12 were it not for the fact that the spring 25 is connected to the eyelet 24 and the ends 25' of its wings engage the ends of the depressions 16. By comparison it will be noted in Figure 2 that the ends 25' of the spring when relaxed, when the rule is completely folded or unfolded, are spaced a short distance from the ends of the depressions 16. However, when the rule is partially unfolded, at which time the wings 23 are out of alignment with the edges 16', the spring 25 is compressed or stressed. This will be seen by comparing Figures 2 and 3. However, the spring 25 when stressed flattens out, as shown in Figure 3, and its tip ends 25' move into engagement with the ends of the depressions 16, with the result that the parts are held in the same central position in which they are held when completely folded or unfolded by the cooperation of the wings 23 with the shoulders 16'. This is an important feature of this invention.

In passing it will be noted that the end edges of the wings 23 are curved on the same radius as the end edges 16' so that there will be no interference with rotational movement of the joint. The spring construction is such that a very strong spring action is provided, strongly holding the rule sections together when extended or folded. However, the spring is allowed plenty of flexibility to permit the separation of the plates which occurs as they move between these two positions. Finally, the clinched eyelet 24 insures a connection which is strong enough to withstand the relatively great pressures exerted by the spring so that there is no danger of the relatively soft brass eyelet 24, which is the material commonly used, to work loose.

It will be apparent that the principles of this invention may be embodied in other physical forms, and we do not, therefore, desire to be strictly limited to the structure disclosed herein for illustrative purposes.

What is claimed is:

1. In combination, a rule joint comprising a pair of plates adapted to be attached to the respective ends of an adjacent pair of rule sections, one of said plates having a pair of aligned recesses at a central aperture and the other a similarly shaped projection nesting therein, a central aperture of the latter being defined by a tubular extension consisting of a conical and a cylindrical portion, said extension lying in the central aperture of the former, a spring mounted on said extension and an eyelet lying in said tubular extension having its end clinched over the spring to connect all of said parts together in pivotal relationship.

2. In the combination of claim 1, said spring having a pair of diametrically aligned wings resting in said pair of aligned recesses.

3. In the combination of claim 1, said eyelet consisting of a conical and a cylindrical portion, the conical portion of the eyelet being nested within the conical portion of said extension to provide enlarged pivoting surfaces.

4. In the combination of claim 1, said latter plate having a pair of diametrically arranged lips struck up so as to engage the former at its central aperture.

5. In the combination of claim 1, said latter plate having abutments adjacent said extension positioned to form pivotal cooperation with said former plate at its central aperture.

6. In combination a rule joint comprising a pair of plates adapted to pivotally connect a pair of adjacent rule sections, each of said plates being through-deformed to provide a recess in one plate and a similarly shaped projection on the other plate, said projection nesting in said recess when the plates are superposed in alignment, a spring lying in the recess formed by said projection, an eyelet passing through said plates and spring to pivotally connect them together, and cooperating means on said plates for permitting relative rotational movement while preventing relative longitudinal movement when the plates are aligned comprising a central opening on one plate and a pair of wings on the other plate abutting the edges of said opening.

FOLKE LINDHE.
WILLIAM H. HODGE.

REFERENCES CITED

The following references are of record in the file of this patent:

UNITED STATES PATENTS

| Number | Name | Date |
|---|---|---|
| 1,983,651 | Anderson et al. | Dec. 11, 1934 |

FOREIGN PATENTS

| Number | Country | Date |
|---|---|---|
| 93,844 | Switzerland | Apr. 1, 1922 |